United States Patent
Hania (10) Patent No.: US 11,952,022 B2
(45) Date of Patent: Apr. 9, 2024

(54) SYSTEM AND METHOD FOR DYNAMIC SELECTION OF HIGH SAMPLING RATE FOR A SELECTED REGION OF INTEREST

(71) Applicant: RAIL VISION LTD, Ra'anana (IL)

(72) Inventor: Shahar Hania, Kedumim (IL)

(73) Assignee: RAIL VISION LTD., Ra'anana (IL)

( * ) Notice: Subject to any disclaimer, the term of this patent is extended or adjusted under 35 U.S.C. 154(b) by 692 days.

(21) Appl. No.: 17/047,774

(22) PCT Filed: May 1, 2019

(86) PCT No.: PCT/IL2019/050485
§ 371 (c)(1),
(2) Date: Oct. 15, 2020

(87) PCT Pub. No.: WO2019/211848
PCT Pub. Date: Nov. 7, 2019

(65) Prior Publication Data
US 2021/0107536 A1    Apr. 15, 2021

Related U.S. Application Data (60) Provisional application No. 62/664,970, filed on May 1, 2018.

(51) Int. Cl.
*B61L 23/04* (2006.01)
*B61L 3/00* (2006.01)
(Continued)

(52) U.S. Cl.
CPC ............. *B61L 23/041* (2013.01); *B61L 3/006* (2013.01); *B61L 15/0072* (2013.01);
(Continued)

(58) Field of Classification Search
CPC ........ B61L 23/041; B61L 3/006; B61L 23/34; B61L 15/0072; G06V 20/58; G06V 20/56
See application file for complete search history.

(56) References Cited

U.S. PATENT DOCUMENTS 10,518,791 B2 * 12/2019 Singh .................... G06F 18/251
11,021,177 B2 *  6/2021 Hania .................... G06V 20/58
(Continued)

FOREIGN PATENT DOCUMENTS

| CN | 102663352 | 9/2012 |
|---|---|---|
| CN | 105636853 | 6/2016 |

(Continued)

OTHER PUBLICATIONS

Office Action of JP Application No. 2020-555369 dated Nov. 26, 2021.

(Continued)

*Primary Examiner* — Gertrude Arthur Jeanglaude
(74) *Attorney, Agent, or Firm* — PEARL COHEN ZEDEK LATZER BARATZ LLP (57) ABSTRACT

Generally, a system including an imaging device and a processing unit is disclosed. The imaging device may be configured to acquire a plurality of datasets of corresponding plurality of image frames by performing corresponding plurality of image frame handling cycles. The processing unit may be configured to define a special region of interest (SROI) in each of at least some of the plurality of the image frames acquired by the imaging device, based on the datasets of the respective image frames. The imaging device may be further configured to acquire at least one partial dataset of the SROI, during each of at least some of the plurality of image frame handling cycles and within a residual time between an end of an image frame acquiring time and an end of the respective image frame handling cycle.

6 Claims, 9 Drawing Sheets

(51) Int. Cl.
  *B61L 15/00* (2006.01)
  *B61L 23/34* (2006.01)
  *G06V 20/56* (2022.01)
  *G06V 20/58* (2022.01)

(52) U.S. Cl.
  CPC .............. *B61L 23/34* (2013.01); *G06V 20/56* (2022.01); *G06V 20/58* (2022.01)

(56) References Cited

U.S. PATENT DOCUMENTS

| | | | |
|---|---|---|---|
| 2006/0098843 A1* | 5/2006 | Chew | B61L 23/041 382/104 |
| 2016/0121912 A1 | 5/2016 | Puttagunta et al. | |
| 2016/0152253 A1 | 6/2016 | Katz et al. | |
| 2016/0274589 A1 | 9/2016 | Templeton et al. | |
| 2017/0308760 A1 | 10/2017 | Kwon et al. | |

FOREIGN PATENT DOCUMENTS

| | | |
|---|---|---|
| CN | 107103623 | 8/2017 |
| EP | 3 208 743 A1 | 8/2017 |
| JP | 1995010003 | 1/1995 |
| JP | 2008-125059 | 5/2008 |
| JP | 2009-147730 | 7/2009 |
| JP | 2016-052134 | 4/2016 |
| WO | WO 97/31810 | 9/1997 |

OTHER PUBLICATIONS

European Search Report of Application No. EP19796039.6 dated Jan. 25, 2022.
Office Action of CN Application No. 2019800296177, dated Jun. 9, 2022.
International Search Report of PCT Application No. PCT/IL2019/050485 dated Aug. 15, 2019.

\* cited by examiner

510 Acquiring, by an imaging device, a plurality of datasets of corresponding plurality of image frames by performing corresponding plurality of image frame handling cycles

520 Defining, by a processing unit, a special region of interest (SROI) in each of at least some of the plurality of the image frames acquired by the imaging device, based on the datasets of the respective image frames

530 Acquiring, by the imaging device, at least one partial dataset of the SROI, during each of at least some of the plurality of image frame handling cycles and within a residual time between an end of an image frame acquiring time and an end of the respective image frame handling cycle

710 Acquiring, by an imaging device, a plurality of datasets of corresponding plurality of image frames by performing corresponding plurality of image frame handling cycles

720 Defining, by a tracking module of a processing unit, a special region of interest (SROI) in each of at least some of the plurality of the image frames acquired by the imaging device, based on the datasets of the respective image frames

721 Detecting rails in each of at least some of the plurality of the image frames

722 Defining margins on both sides of the detected rails in each of at least some of the plurality of the image frames

723 Defining a safe braking line in each of at least some of the plurality of the image frames, based on a safe braking distance of the train

724 Defining a safe zone in each of at least some of the plurality of the image frames, based on the defined margins and the defined safe braking line

725 Defining a special region of interest (SROI) in each of at least some of the plurality of the image frames at a distal end of the defined safe zone

726 Defining the SROI in subsequent image frames and thereby tracking the location of the SROI in the image frames thereof

SYSTEM AND METHOD FOR DYNAMIC SELECTION OF HIGH SAMPLING RATE FOR A SELECTED REGION OF INTEREST

CROSS-REFERENCE TO RELATED APPLICATIONS

This application is a National Phase Application of PCT International Application No. PCT/IL2019/050485, International Filing Date May 1, 2019, entitled "System and Method for Dynamic Selection of High Sampling Rate for a Selected Region of Interest", published on Nov. 7, 2019 as International Patent Application Publication No. WO 2019/211848 claiming the benefit of U.S. Patent Provisional Application No. 62/664,970, filed on May 1, 2018, which is hereby incorporated by reference.

FIELD OF THE INVENTION

The present invention relates to the field of enhancing a sampling rate of an imaging device, and more particularly, to enhancing the sampling rate for a selected region of interest in an image frame for better detection performance.

BACKGROUND OF THE INVENTION

Processing of details of an image frame, and specifically applying of calculations on the image frame's data, is inherently in contradiction to at least one of computation resources and computation time. The higher the required resolution of frame details the larger is the required computation resources and/or the slower is the computation result. Applying high resolution computation to only a pre-selected portion of an image frame (e.g., a region of interest (ROI)) may shorten the processing result time and/or lower the computation load. However, the selected ROI may accidently not include at least some image details that may be of high importance, thereby the resulting benefit may not balance with the loss of important data.

For example, when the processed image frame is taken from a forward looking imaging device of a running train (for example in order to provide advance warning of threatening obstacles) there is a need for fast processing of the image frame's details along with ensuring that details included in a region encircling the rails forward of the train (e.g., also called 'safety zone' (SZ), or 'gabarit'), with probability of detection (PD) of an obstacle higher than a given threshold and false alarm rate (FAR) lower than a given second threshold.

SUMMARY OF THE INVENTION

One aspect of the present invention may provide a system for enhancing a sampling rate of an imager detector for a selected region of interest, the system may include: an imaging device; and a processing unit in communication with the imaging device; wherein the imaging device is configured to acquire a plurality of datasets of corresponding plurality of image frames by performing corresponding plurality of image frame handling cycles; wherein the processing unit is configured to define a special region of interest (SROI) in each of at least some of the plurality of the image frames, based on the datasets of the respective image frames; and wherein the imaging device is further configured to acquire at least one partial dataset of the SROI, during each of at least some of the plurality of image frame handling cycles and within a residual time between an end of an image frame acquiring time and an end of the respective image frame handling cycle.

Another aspect of the present invention may provide a method of enhancing a sampling rate of an imager detector for a selected region of interest, the method may include: acquiring, by an imaging device, a plurality of datasets of corresponding plurality of image frames by performing corresponding plurality of image frame handling cycles; defining, by a processing unit, a special region of interest (SROI) in each of at least some of the plurality of the image frames, based on the datasets of the respective image frames; and acquiring, by the imaging device, at least one partial dataset of the SROI, during each of at least some of the plurality of image frame handling cycles and within a residual time between an end of an image frame acquiring time and an end of the respective image frame handling cycle.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

It will be appreciated that, for simplicity and clarity of illustration, elements shown in the figures have not necessarily been drawn to scale. For example, the dimensions of some of the elements may be exaggerated relative to other elements for clarity. Further, where considered appropriate,

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Some aspects of the present invention may provide a system and method for enhancing a sampling rate of an imaging device for a selected region of interest in an image frame.

According to some embodiments, the system may include an imaging device and a processing unit.

According to some embodiments, the imaging device may be configured to acquire a plurality of datasets of corresponding plurality of image frames by performing corresponding plurality of image frame handling cycles.

According to some embodiments, the processing unit may be configured to define a special region of interest (SROI) in each of at least some of the plurality of the image frames acquired by the imaging device, based on the datasets of the respective image frames. The SROI may be a region in the image frames in which extended image processing resolution (e.g., spatial resolution) may be needed.

According to some embodiments, the imaging device may be further configured to acquire at least one partial dataset of the SROI, during each of at least some of the plurality of image frame handling cycles and within a residual time between an end of an image frame acquiring time and an end of the respective image frame handling cycle.

Advantageously, the disclosed system and method may enable to increase the rate of acquiring datasets of the SROI within full image frames while maintaining the frame rate of the imaging device at the given frame rate value.

Figure 1A:
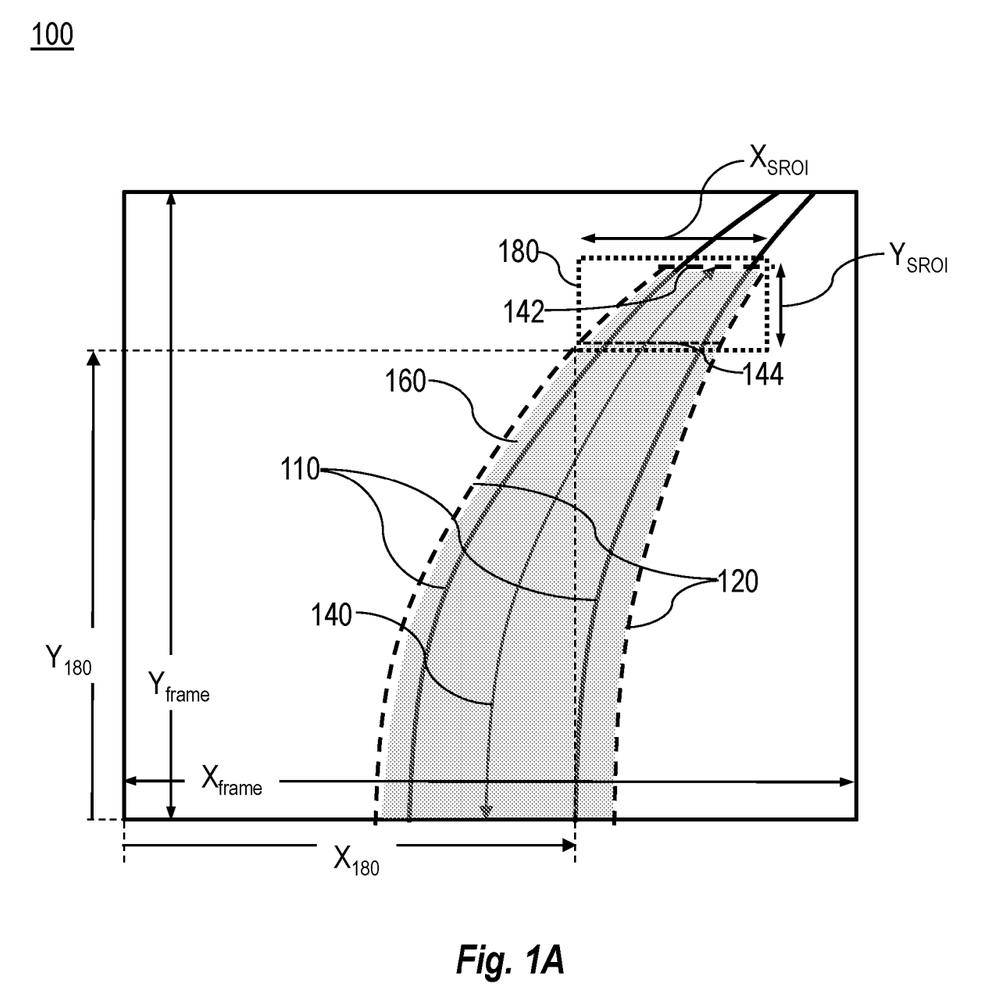
FIG. 1A is a schematic illustration of an image frame depicting rails with side margins and a safe braking line defining a safe braking distance range, according to some embodiments of the invention.
Figure 1B:
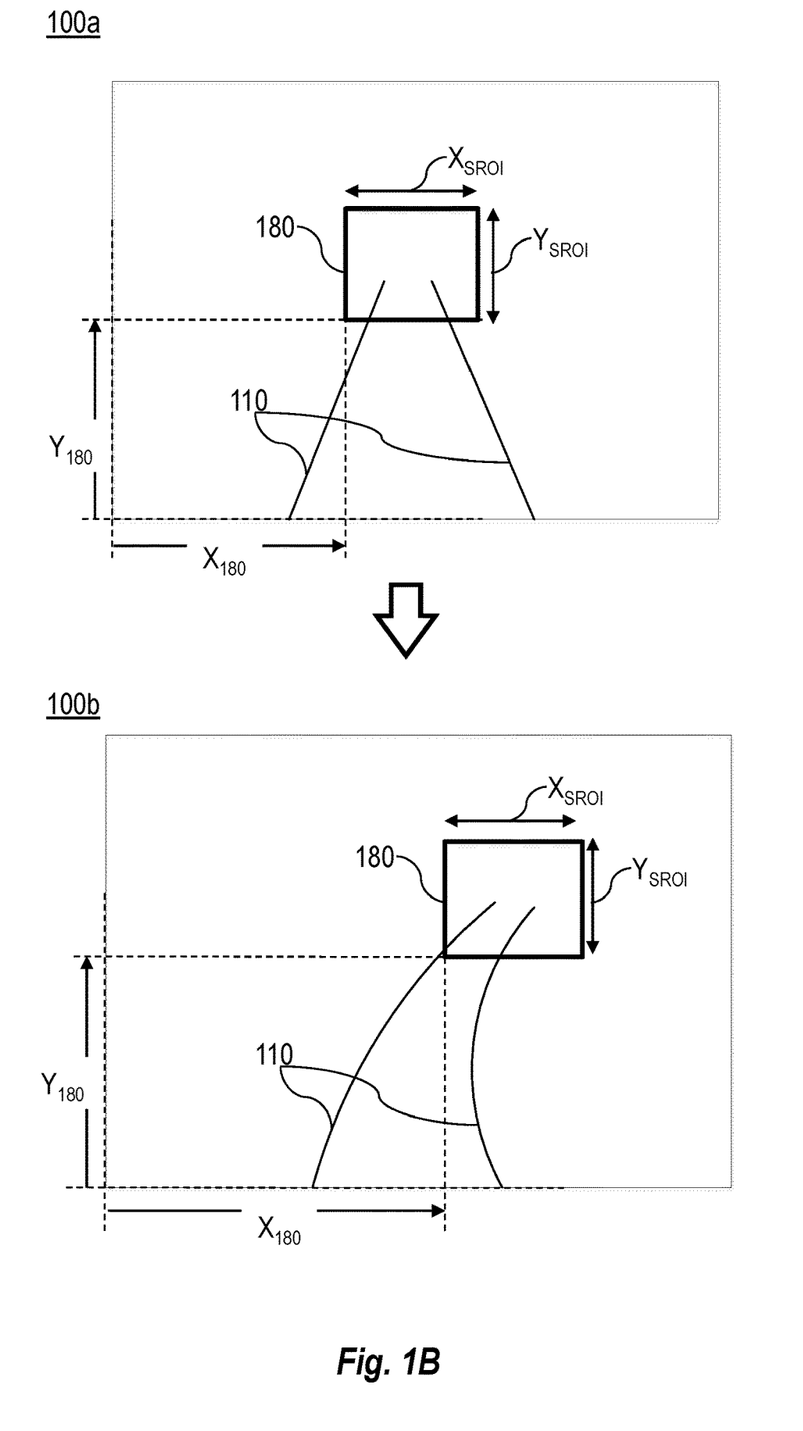
FIG. 1B is a schematic illustration of image frames depicting rails and a special region of interest (SROI) within the image frames, according to some embodiments of the invention.

Reference is made to FIG. 1A, which is a schematic illustration of an image frame 100 depicting rails 110 with side margins 120 and a safe braking line 142 defining a safe braking distance range 140, according to some embodiments of the invention. Reference is also made to FIG. 1B, which is a schematic illustration of image frames 100a, 100b depicting rails 110 and a special region of interest (SROI) 180 within the image frames, according to some embodiments of the invention.

A safety zone 160 (e.g., depicted in FIG. 1A by light grey color) of a traveling train may be defined as an area with defined margins 120 on both sides of rails 110 ranging from the train's leading end (e.g., the locomotive of the train) to safe braking distance 140 along rails 110 forward of the train. Safety zone 160 may represent an area in which identified objects may be of a high probability to pose risk to the traveling train.

Typically, safety zone 160 may have in image frame 100 a shape that narrows from the bottom portion of the imaged area that is close to the bottom of image frame 100 as safe zone 160 progresses toward the top of image frame 20. Safe braking distance 140 may be directly proportional to the traveling speed of the train (and, in a lower degree of importance, to the mechanical condition of the train and the rails and of certain weather aspects).

Horizontal line 144 drawn at a distance from safe braking line 142 (towards the travelling train) in FIG. 1A may define a special region of interest (SROI) 180 inside safety zone 160 in which, due to the distance from the train, extended image processing resolution may be needed, in order to ensure sufficient capability to identify objects that may threaten the train.

SROI 180 may, for example, have rectangular shape with width $X_{SROI}$ and height $Y_{SROI}$ where the dimension $X_{SROI}$ is parallel to the horizontal dimension $X_{frame}$ of image frame 100 and the dimension $Y_{SROI}$ is parallel to the vertical dimension $Y_{frame}$ of image frame 100. The location of SROI 180 within image frame 100 may be denoted by the 2-dimensional distance of one of its corners from a reference corner of image frame 100. For example, the location of SROI 180 within image frame 100 may be denoted by the horizontal distance $X_{180}$ and the vertical distance $Y_{180}$.

The size, aspect ratio and location of SROI 180 within image frame 100 (collectively—SROI parameters) may be determined or selected, for example, so that it encompasses the distal end of safety zone 160. The size of SROI 180 may be set so as to balance between the need to provide higher resolution for as large as possible details inside SROI 180 and the need to operate within the given performance figures of the system, such as frame rate and maximal data capacity. The rectangular shape of SROI 180 may be preferred in systems that, for example, support direct, easy and resources-saving setting of the location and size of SROI 180.

One or more from the following considerations may be relied upon in deciding/defining the parameters of SROI 180: (i) desired object resolution in the SROI, (ii) expected or desired probability of detection and false alarm rate figures, (iii) available computational resources for image processing, (iv) available frame rate of the imaging device, and the like. For example, the vertical dimension and the vertical position of SROI 180 may be selected to encompass safe braking line 142 and horizontal line 144. The horizontal dimension and the horizontal position of SROI 180 may be selected to encompass the entire portion of safety zone 160 extending between safe braking line 142 and horizontal line 144.

According to some embodiments, SROI 180 may be defined in the image frames using a tracking module (e.g., as described below with respect to FIG. 6). The tracker module may be configured to define and track the locations in the image frames where rails 110 are imaged.

The tracking module may be further configured to define the locations of rails 110 in subsequent image frames 100 to thereby track the location of SROI 180 in image frames 100. For example, FIG. 1B depicts a first image frame 100*a* with SROI 180 located around the distal end of rails 110, substantially in the middle of first image frame 100*a*, and second image frame 100*b* with SROI 180 located around the distal end of rails 110, located sideway of the center of second image frame 100*b*, as a result of the operation of the tracking module.

One way to reach high probability of detection of obstacles that may threaten the train and/or low false alarm rate thereof is to decrease the probability of events by selecting SROI 180 that is smaller than the entire image frame 100. The disadvantage of this is that events outside SROI 180 will not be detected and some of them might be too important to be mis-detected.

Another way to reach high probability of detection of obstacles that may threaten the train and/or low false alarm rate thereof is to increase the sampling Band Width (BW) by increasing the frame rate of the imaging device. The consequences of this may include an increased load on the computational resources (e.g., processing unit) of the system.

According to some embodiments, the disclosed system and method may enable to increase the sampling rate of SROI 180 within full image frames while maintaining the frame rate of the imaging device at a given frame rate (e.g., as described below with respect to FIG. 3).

In this manner, the disclosed system and method may, for example, enable increasing the probability of detection of obstacles that may threaten the train and/or decreasing false alarm rate thereof without substantially loading the computation resources and enabling use of existing interface of the imaging device.

Figure 2:
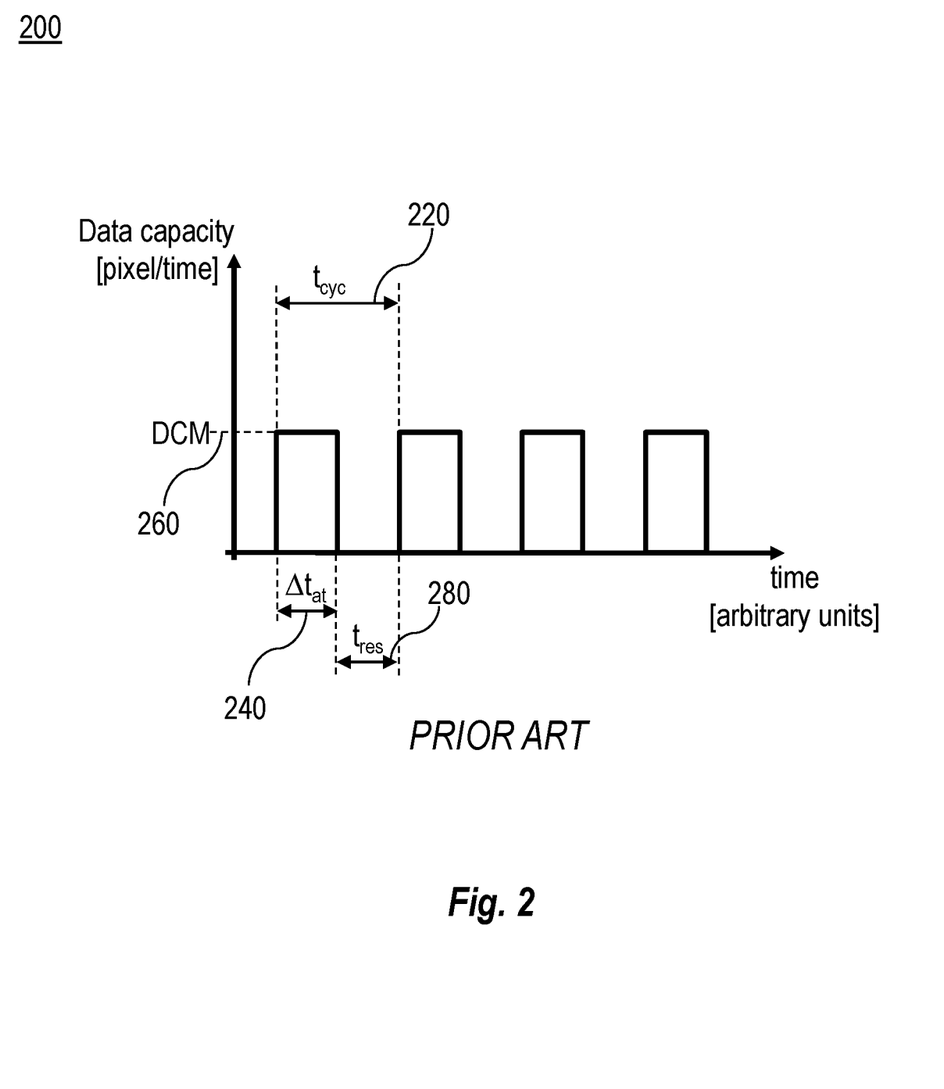
FIG. 2 is a schematic time graph of a common image frame handling by an imaging device.

Reference is now made now to FIG. 2, which is a schematic time graph 200 of a common image frame handling by an imaging device.

Image frames are typically being acquired at a given frame rate (e.g., interchangeably referred hereinafter as "FR") with a given cycle time 220 between the image frames (e.g., interchangeably referred hereinafter as "$t_{cyc}$"), wherein given cycle time 220 is inversely proportional to the given frame rate (e.g., $t_{cyc}=1/FR$). Typically, acquiring of each image frame lasts an image frame acquiring time 240 (e.g., interchangeably referred hereinafter as "$\Delta t_{at}$") and includes acquiring of data items (e.g., datasets) according to a maximal data capacity (DCM) 260 per time unit (e.g., pixel/time) of the imaging device.

Accordingly, the amount of acquired data items (e.g., interchangeably referred hereinafter as "pixel per frame" or "PPF") at each $\Delta t_{at}$ in normal mode of operation of the imaging device may be expressed by Equation 1 and the amount of acquired data items per second (e.g., interchangeably referred hereinafter as "DPS") at the given frame rate (FR) of the imaging device may be expressed by Equation 2:

$$PPF = \Delta t_{ac} \cdot DCM \quad \text{(Equation 1)}$$

$$DPS = PF*FR = \Delta t*DCM*FR \quad \text{(Equation 2)}$$

Typical imaging device may have a certain maximum data handling capacity which involves image photons accumulation at an imager thereof, image data transfer from the imaging device, image data saving and image data processing. The specific performance of the imaging device may define image frame acquiring time 240 ($\Delta t_{at}$) needed to acquire the data items of each full image frame. Typically, image frame acquiring time 240 ($\Delta t_{at}$) is smaller than given cycle time 220 ($t_{cyc}$), which stems that there is a residual time 280 (e.g., interchangeably referred hereinafter as "$t_{res}$") during each given cycle time 220 (e.g., $t_{cyc}$) at which the imaging device is not busy.

Figure 3:
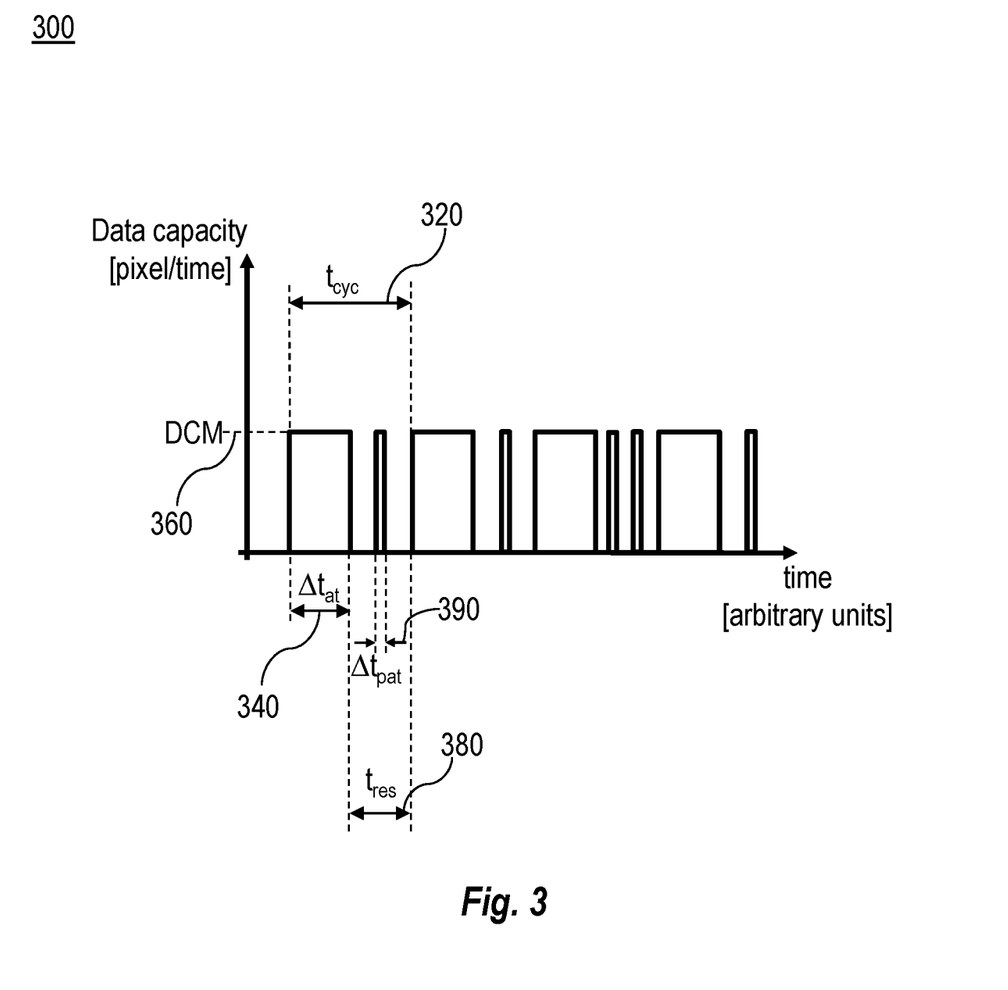
FIG. 3 is a time graph of an image frame handling, according to embodiments of the present invention.

Reference is now made to FIG. 3, which is a time graph 300 of an image frame handling, according to embodiments of the present invention.

A handling cycle of an image frame may last a given cycle time 320 (e.g., $t_{cyc}$) and may include an image frame acquiring time 340 (e.g., $\Delta t_{at}$) during which data items (e.g., dataset) of a full image frame are being acquired and a residual time 380 (e.g., $t_{res}$) during which the imaging device is not busy. For example, given cycle time 320, image frame acquiring time 340 and residual time 380 may be similar to given cycle time 220, image frame acquiring time 240 and residual time 280, respectively, described above with respect to FIG. 2.

According to embodiments, during residual time 380 of at least one image frame handling cycle, at least one additional cycle of acquiring data items of a selected portion of the image frame may be performed (e.g., as shown in FIG. 3). The data items acquired from the selected portion of the image frame are interchangeably referred hereinafter as "partial data items" or "partial dataset" or "partial datasets". The acquiring of the partial data items/partial datasets of the selected portion of the image frame may last a partial acquiring time 390 (interchangeably referred hereinafter as "$\Delta t_{pat}$"). The selected portion of the image frame may be a region in the image frames in which extended image processing resolution may be needed. The selected portion of the image frame may, for example, be a special region of interest in the image frame, such as SROI 180 described above with respect to FIGS. 1A and 1B.

Partial acquiring time 390 ($\Delta t_{pat}$) required for acquiring partial data items of the selected portion of the image frame may depend on, for example, the size of the selected portion and the acquiring data rate (pixel/ms). Assuming that the acquiring data rate of the selected portion is the same as the acquiring data rate of the full image frame acquiring, the ratio $\Delta t_{pda}/\Delta t_{da}$ equals to the ratio of the area of the selected portion of the image frame to the area of the full image. In some embodiments, the selected portion of the image frame is significantly smaller as compared to the full image frame such that $\Delta t_{pda} \ll \Delta t_{da}$ (e.g., as shown in FIG. 3). For example, the selected portion of the image frame may be 200×200 pixels as compared to, for example, a full image frame that has 1024×720 pixels. In this example, the partial amount of data items acquired from the selected portion of the image frame may be only 5% of the amount of data items that need to be acquired from the full image frame.

Accordingly, one or more additional cycles of acquiring partial data items/partial datasets of the selected portion of the image frame may be performed during residual time 380 of each of one or more image frame handling cycle, thereby increasing the image resolution for details in the selected portion of the image frame, without changing the frame rate or having to exceed a given maximal data capacity (DCM) 360 (like DCM 260 described above with respect to FIG. 2) of the imaging device.

For example, for the embodiment depicted in FIG. 3 the amount of acquired data items per second (DPS) at the given frame rate (FR) of the imaging device may be expressed by Equation 3:

$$DPS = (\Delta t_{da} + \Delta t_{pda}) \cdot DCM \cdot FR|_{\Delta t da >> \Delta t p da} \approx \Delta t_{da} \cdot DCM \cdot FR \quad \text{(Equation 3)}$$

Figure 4:
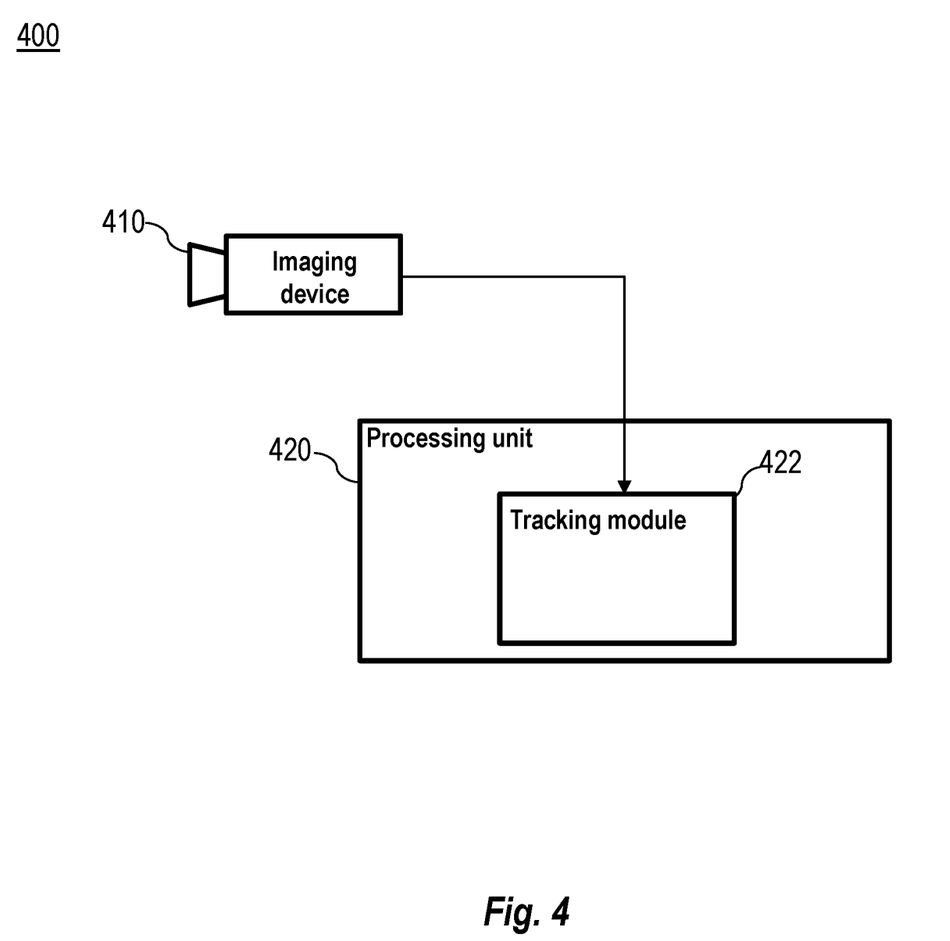
FIG. 4 is a schematic illustration of a system for enhancing a sampling rate of an imager detector for a selected region of interest in an image frame, according to some embodiments of the invention.

Reference is now made to FIG. 4, which is a schematic illustration of a system 400 for enhancing a sampling rate of an imager detector for a selected region of interest in an image frame, according to some embodiments of the invention.

According to some embodiments, system 400 may include an imaging device 410 and a processing unit 420. System 400 may be disposed on, for example, a locomotive of a train such that imaging device 410 faces the direction of travel of the train. However, system 400 may be applicable in other applications as well (such as, for example, automobiles, etc.).

According to some embodiments, imaging device 410 may be configured to acquire a plurality of datasets of corresponding plurality of image frames by performing corresponding plurality of image frame handling cycles. For example, the image frames acquired by imaging device 410 may be similar to image frame 100 described above with respect to FIG. 1A.

According to some embodiments, processing unit 420 may be configured to define a special region of interest (SROI) in each of at least some of the plurality of the image frames acquired by imaging device 410, based on the datasets of the respective image frames. The SROI may be a region in the image frames in which extended image processing resolution may be needed. For example, the SROI may be SROI 180 described above with respect to FIGS. 1A and 1B.

According to some embodiments, imaging device 410 may be further configured to acquire at least one partial dataset of the SROI, during each of at least some of the plurality of image frame handling cycles and within a residual time between an end of an image frame acquiring time and an end of the respective image frame handling cycle (e.g., as described above with respect to FIG. 3).

Figure 5:
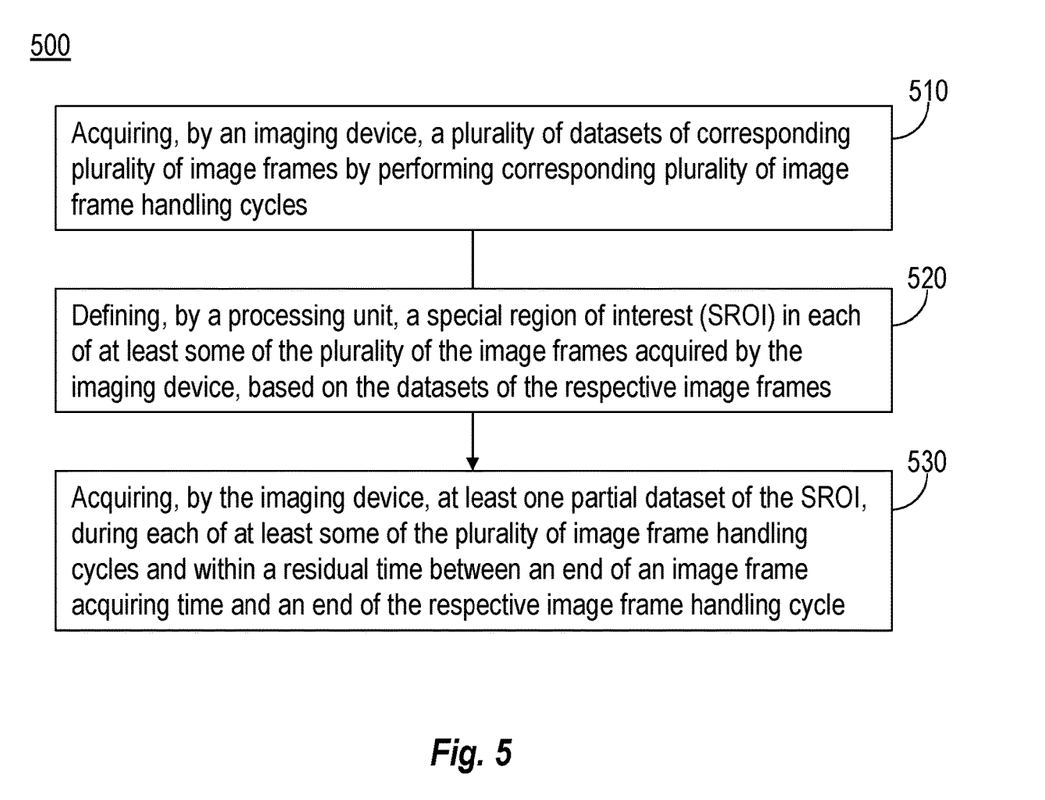
FIG. 5 is a flowchart of a method of for enhancing a sampling rate of an imager detector for a selected region of interest in an image frame, according to some embodiments of the invention.

Reference is now made to FIG. 5, which is a flowchart of a method 500 of for enhancing a sampling rate of an imager detector for a selected region of interest in an image frame, according to some embodiments of the invention.

Method 500 may be implemented by system 400 (e.g., as described above with respect to FIG. 4), which may be configured to implement method 500. It is noted that method 500 is not limited to the flowcharts illustrated in FIG. 5 and to the corresponding description.

According to some embodiments, method 500 may include acquiring, by an imaging device, a plurality of datasets of corresponding plurality of image frames by performing corresponding plurality of image frame handling cycles (stage 510). For example, imaging device 410 described above with respect to FIG. 4.

According to some embodiments, method 500 may include defining, by a processing unit, a special region of interest (SROI) in each of at least some of the plurality of the image frames acquired by the imaging device, based on the datasets of the respective image frames (stage 520). For example, the SROI described above with respect to FIG. 4.

According to some embodiments, method 500 may include acquiring, by the imaging device, at least one partial dataset of the SROI, during each of at least some of the plurality of image frame handling cycles and within a residual time between an end of an image frame acquiring time and an end of the respective image frame handling cycle (stage 530) (e.g., as described above with respect to FIG. 3).

Advantageously, system 400 and method 500 may enable to increase the rate of acquiring datasets of the SROI within full image frames while maintaining the frame rate of the imaging device at the given frame rate.

Figure 6:
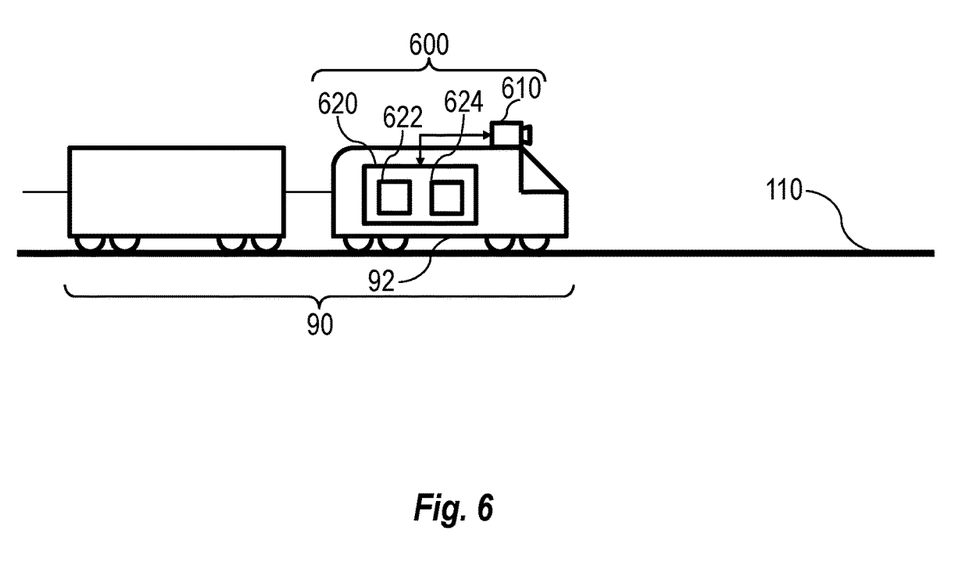
FIG. 6 is a schematic illustration of an optical system for an obstacle detection by a moving train and capable of enhancing a sampling rate of an imager detector for a selected region of interest in an image frame, according to some embodiments of the invention.

Reference is now made to FIG. 6, which is a schematic illustration of an optical system 600 for an obstacle detection by a moving vehicle 90, such as a train and capable of enhancing a sampling rate of an imager detector for a selected region of interest in an image frame, according to some embodiments of the invention.

According to some embodiments, system 600 may include an imaging device 610 and a processing unit 620. System 600 may be disposed on a locomotive 92 of a train 90 such that imaging device 610 faces the direction of travel of train 90.

According to some embodiments, imaging device 610 may be configured to acquire a plurality of datasets of corresponding plurality of image frames by performing corresponding plurality of image frame handling cycles. For example, the image frames acquired by imaging device 610 may be similar to image frame 100 described above with respect to FIGS. 1A and 1B. In some embodiments, imaging device 610 is an infrared detector.

The image frames may depict at least rails 110 in front of moving locomotive 92. The image frame handling cycles may be performed by imaging device 610 at a given frame rate and with a given cycle time between the image frames. For example, the given frame rate FR, given cycle time 320 (e.g., $t_{cyc}$) and the image frame handling cycles as described above with respect to FIG. 3.

According to some embodiments, processing unit 620 may include a tracking module 622.

In some embodiments, tracking module 622 may be configured to detect rails in each of at least some of the plurality of the image frames acquired by imaging device 410. For example, the rails may be such as rails 110 described above with respect to FIG. 1A.

The rails may be detected in the image frames using any technique known in the art. For example, the rails may be detected based on temperature differences between the rails and their background (e.g., when imaging device 610 is the infrared detector).

In some embodiments, tracking module 622 may configured to define margins on both sides of the detected rails in each of at least some of the plurality of the image frames. For example, the margins may be margins 120 described above with respect to FIG. 1A. The margins may be defined according to efficiency/quality of the rail's detection. For example, the better detection of the rails the smaller the distance of the margins to the rails may be. Yet in this example, if the rails are not well detected, the margins may be set at a larger distance from the rails to compensate for poor rails detection.

In some embodiments, tracking module 622 may be configured to define a safe braking line in each of at least some of the plurality of the image frames, based on a safe braking distance of train 90. For example, the safe braking line and the safe braking distance may be similar to safe braking line 142 and safe braking distance 140 described above with respect to FIG. 1A. The safe braking distance may be determined based on, for example, a speed of train 90.

In some embodiments, tracking module 622 may be configured to define a safe zone in each of at least some of the plurality of the image frames, based on the defined margins and the defined safe braking line. For example, the safety zone may safety zone 160 described above with respect to FIG. 1A.

In some embodiments, tracking module 622 may be configured to define a special region of interest (SROI) in each of at least some of the plurality of the image frames at a distal end of the defined safe zone. For example, the SROI may be SROI 180 described above with respect to FIG. 1A.

The SROI may be a zone in which, due to the distance from train 90, extended image processing resolution may be needed, in order to ensure sufficient capability to detect objects that may threaten train 90.

In some embodiments, tracking module 622 may be configured to define the SROI in subsequent image frames to thereby track the location of the SROI in the image frames thereof (e.g., as described above with respect to FIG. 1B).

According to some embodiments, imaging device 610 may be further configured to acquire at least one partial dataset of the SROI, during each of at least some of the plurality of image frame handling cycles and within a residual time between an end of an image frame acquiring time and an end of the respective image frame handling cycle (e.g., as described above with respect to FIG. 3).

According to some embodiments, processing unit 620 may include an obstacle detection module 624. Obstacle detection module 624 may be configured to analyze the datasets of full image frames and/or the partial datasets of the SROI in the full image frames and to detect, based on the analysis thereof, a potential object/obstacle on rails 110 and/or in the defined SROI.

Figure 7:
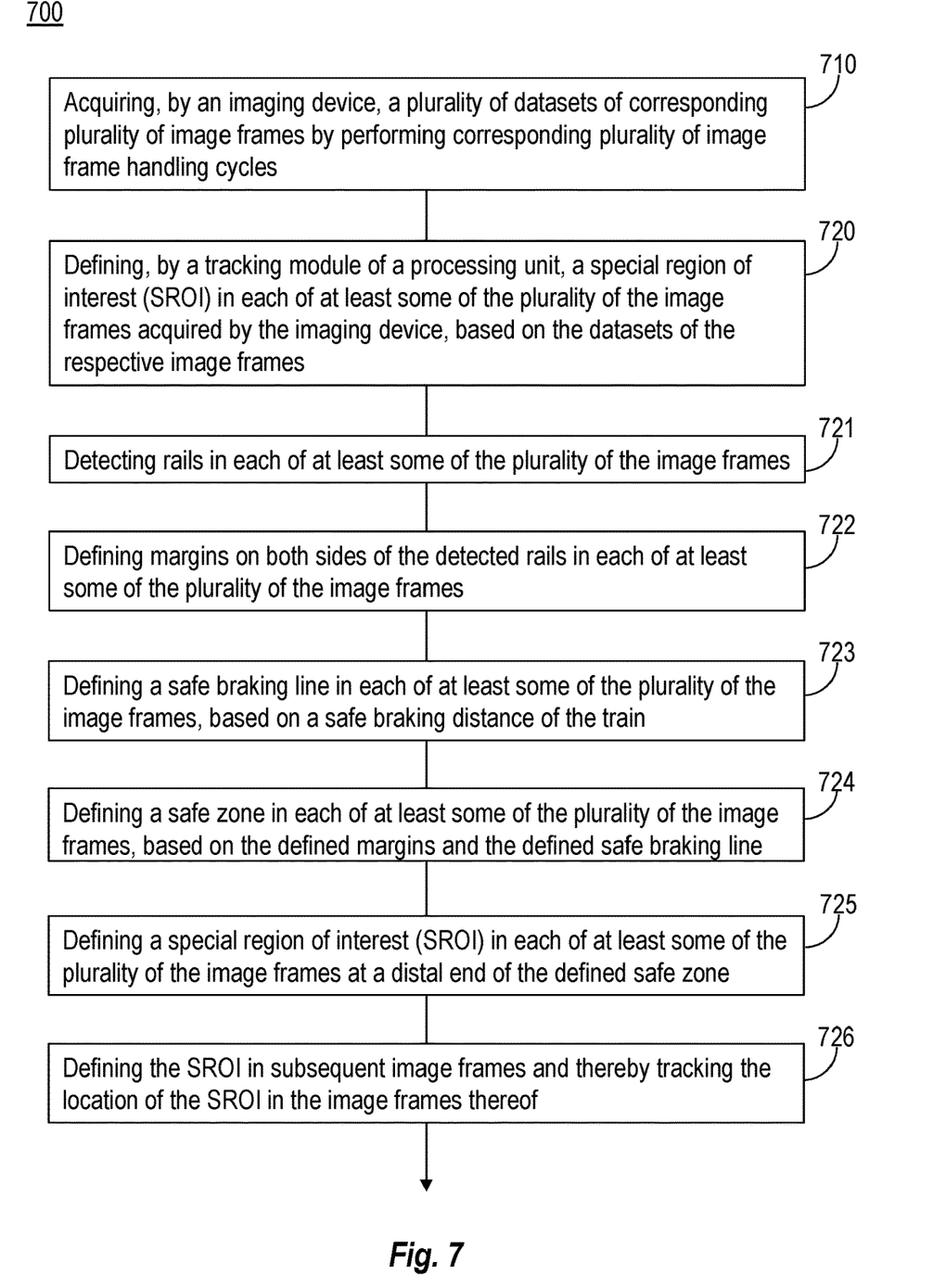
FIG. 7 is a flowchart of a method of an obstacle detection by a moving train while enhancing a sampling rate of an imager detector for a selected region of interest in an image frame, according to some embodiments of the invention.

Reference is now made to FIG. 7, which is a flowchart of a method 700 of an obstacle detection by a moving train while enhancing a sampling rate of an imager detector for a selected region of interest in an image frame, according to some embodiments of the invention.

Method 700 may be implemented by system 600, which may be configured to implement method 700. It is noted that method 700 is not limited to the flowcharts illustrated in FIG. 7 and to the corresponding description. For example, in various embodiments, method 700 needs not move through each illustrated box or stage, or in exactly the same order as illustrated and described.

According to some embodiments, method 700 may include acquiring, by an imaging device, a plurality of datasets of corresponding plurality of image frames by performing corresponding plurality of image frame handling cycles (stage 710). For example, the imaging device may be like imaging device 610 described above with respect to FIG. 6.

According to some embodiments, method 700 may include defining, by a tracking module of a processing unit, a special region of interest (SROI) in each of at least some of the plurality of the image frames acquired by the imaging device, based on the datasets of the respective image frames (stage 720). For example, the tracking unit and the processing unit may be like tracking unit 622 and processing unit 620 described above with respect to FIG. 6. The SROI may be like SROI 180 described above with respect to FIGS. 1A and 1B.

In some embodiments, method 700 may further include detecting rails in each of at least some of the plurality of the image frames (stage 721) (e.g., as described above with respect to FIG. 6).

In some embodiments, method 700 may further include defining margins on both sides of the detected rails in each of at least some of the plurality of the image frames (stage 722) (e.g., as described above with respect to FIG. 6).

In some embodiments, method 700 may further include defining a safe braking line in each of at least some of the plurality of the image frames, based on a safe braking distance of the train (stage 723) (e.g., as described above with respect to FIG. 6).

In some embodiments, method 700 may further include defining a safe zone in each of at least some of the plurality of the image frames, based on the defined margins and the defined safe braking line (stage 724) (e.g., as described above with respect to FIG. 6).

In some embodiments, method 700 may further include defining a special region of interest (SROI) in each of at least some of the plurality of the image frames at a distal end of the defined safe zone (stage 725) (e.g., as described above with respect to FIG. 6).

In some embodiments, method 700 may further include defining the SROI in subsequent image frames and thereby tracking the location of the SROI in the image frames thereof (stage 726) (e.g., as described above with respect to FIG. 6).

According to some embodiments, method 700 may include acquiring, by the imaging device, at least one partial dataset of the SROI, during each of at least some of the plurality of image frame handling cycles and within a residual time between an end of an image frame acquiring time and an end of the respective image frame handling cycle (stage 730) (e.g., as described above with respect to FIG. 3 and FIG. 6).

According to some embodiments, method 700 may include analyzing, by an obstacle detection module of the processing unit, the datasets of full image frames and/or the partial datasets of the SROI in the full image frames and to detect, based on the analysis thereof, a potential object/obstacle on the rails and/or in the defined SROI (stage 740). For example, the obstacle detection module like obstacle detection module 624 described above with respect to FIG. 6.

Advantageously, system 600 and method 700 may enable to increase the sampling rate of SROI 180 within full image frames while maintaining the frame rate of the imaging device at a given frame rate (e.g., as described below with respect to FIG. 3). In this manner, system 600 and method 700 may enable increasing the probability of detection of obstacles that may threaten the train and/or decreasing false alarm rate thereof without substantially loading the computation resources and enabling use of existing interface of the imaging device.

According to some embodiments described above, higher image resolution for a selected portion of an image frame may be obtained without changing a given frame rate or data capacity of an imaging device. The size of the selected portion and its location within the image frame may be determined or dictated. According to some embodiments, the size and location of the selected portion in the image frame may be set to meet a special region of interest (SROI) for which higher image resolution may be needed.

For example, for a system usable for monitoring rails track of a train and providing advance warning of obstacles near or on the rails, enhanced image resolution may be required for a portion of the image which includes a distal portion of rails detected in the image frames (e.g., as described above with respect to FIGS. 1A and 1B, FIG. 6 and FIG. 7). In order to decide the location and size of the SROI, a tracking module may be used. The tracking module may be a graphical processing unit that tracks the presence of rails in the image frame. Such tracking module may be embodied as program running on a computer handling the image processing. For example, if the proximal ends of the rails in the image frame (typically close to the middle of the lower end of the image, with noticeable presence) are tracked upwardly the image frame, the location of the distal ends of the rails within the image frame may be detected using relatively low additional computation load. The result of the tracking of the distal ends of the train rails within the image frame may then be translated to the location and size of the SROI.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for enhancing a sampling rate of an imager detector for a selected region of interest, the system comprising:
    an imaging device; and
    a processing unit in communication with the imaging device;
    wherein the imaging device is configured to acquire a plurality of datasets of corresponding plurality of image frames by performing corresponding plurality of image frame handling cycles;
    wherein the processing unit is configured to define a special region of interest (SROI) in each of at least some of the plurality of the image frames, based on the datasets of the respective image frames; and
    wherein the imaging device is further configured to acquire at least one partial dataset of a corresponding at least one partial image frame comprising the SROI, during each of at least some of the plurality of image frame handling cycles and within a residual time between an end of an image frame acquiring time and an end of the respective image frame handling cycle.

2. The system of claim 1, disposed on a locomotive of a train such that the imaging device faces a direction of travel of the train, and wherein the processing unit comprises a tracking module configured to:
- detect rails in each of at least some of the plurality of the image frames;
- define margins on both sides of the detected rails in each of at least some of the plurality of the image frames;
- define a safe braking line in each of at least some of the plurality of the image frames, based on a safe braking distance of the train;
- define a safe zone in each of at least some of the plurality of the image frames, based on the defined margins and the defined safe braking line; and
- define the SROI in each of at least some of the plurality of the image frames at a distal end of the defined safe zone.

3. The system of claim 2, wherein the processing unit comprises an obstacle detection module configured to:
- analyze at least the partial datasets of the SROI in the full image frames; and
- detect based on the analysis thereof, a potential object/obstacle on rails or in the defined SROI.

4. A method of enhancing a sampling rate of an imager detector for a selected region of interest, the method comprising:
- acquiring, by an imaging device, a plurality of datasets of corresponding plurality of image frames by performing corresponding plurality of image frame handling cycles;
- defining, by a processing unit, a special region of interest (SROI) in each of at least some of the plurality of the image frames, based on the datasets of the respective image frames; and
- acquiring, by the imaging device, at least one partial dataset of a corresponding at least one partial image frame comprising the SROI, during each of at least some of the plurality of image frame handling cycles and within a residual time between an end of an image frame acquiring time and an end of the respective image frame handling cycle.

5. The method of claim 4, further comprising: detecting, by a tracking module of the processing unit, rails in each of at least some of the plurality of the image frames;
- defining, by the tracking module, margins on both sides of the detected rails in each of at least some of the plurality of the image frames;
- defining, by the tracking module, a safe braking line in each of at least some of the plurality of the image frames, based on a safe braking distance of the train;
- defining, by the tracking module, a safe zone in each of at least some of the plurality of the image frames, based on the defined margins and the defined safe braking line; and
- defining, by the tracking module, the SROI in each of at least some of the plurality of the image frames at a distal end of the defined safe zone.

6. The method of claim 5, further comprising:
- analyzing, by an obstacle detection module of the processing unit, at least the partial datasets of the SROI in the full image frames; and
- detecting, by the obstacle detection module, based on the analysis thereof, a potential object/obstacle on rails or in the defined SROI.

* * * * *